United States Patent
O'Brien, Jr. et al.

(10) Patent No.: US 6,397,234 B1
(45) Date of Patent: May 28, 2002

(54) SYSTEM AND APPARATUS FOR THE DETECTION OF RANDOMNESS IN TIME SERIES DISTRIBUTIONS MADE UP OF SPARSE DATA SETS

(75) Inventors: Francis J. O'Brien, Jr., Newport, RI (US); Chung T. Nguyen, Austin, TX (US); Bruce J. Bates, Portsmouth, RI (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 0 days.

(21) Appl. No.: 09/379,210

(22) Filed: Aug. 20, 1999

(51) Int. Cl.[7] .............................. G06F 7/00; G06K 9/00
(52) U.S. Cl. ...................................... 708/200; 382/228
(58) Field of Search .................. 708/200, 520; 382/228, 181, 209, 210, 224, 225; 706/20

(56) References Cited

U.S. PATENT DOCUMENTS

| | | | | |
|---|---|---|---|---|
| 5,384,895 A | * | 1/1995 | Rogers et al. ................. 706/20 |
| 5,568,591 A | * | 10/1996 | Minot et al. ................... 706/25 |
| 5,909,190 A | * | 6/1999 | Lo et al. ...................... 342/159 |
| 6,035,057 A | * | 3/2000 | Hoffman ...................... 382/159 |
| 6,052,483 A | * | 4/2000 | Baird et al. .................. 382/190 |
| 6,092,059 A | * | 7/2000 | Straforini et al. ............. 706/14 |
| 6,327,581 B1 | * | 12/2001 | Platt ............................ 706/12 |

* cited by examiner

Primary Examiner—Chuong Dinh Ngo
(74) Attorney, Agent, or Firm—Michael J. McGowan; Prithvi C. Lall; Michael F. Oglo (57) ABSTRACT

A method and apparatus are provided for automatically characterizing the spatial arrangement among the data points of a time series distribution in a data processing system wherein the classification of said time series distribution is required. The method and apparatus utilize a grid in Cartesian coordinates to determine (1) the number of cells in the grid containing at least-one input data point of the time series distribution; (2) the expected number of cells which would contain at least one data point in a random distribution in said grid; and (3) an upper and lower probability of false alarm above and below said expected value utilizing a discrete binomial probability relationship in order to analyze the randomness characteristic of the input time series distribution. A labeling device also is provided to label the time series distribution as either random or nonrandom, and/or random or nonrandom.

11 Claims, 5 Drawing Sheets

Binomial Table for k=24, Θ=.713, α=.01

| m | $P(M=m) = \binom{k}{m}\Theta^m(1-\Theta)^{k-m}$ | $P(M \leq m) = \sum_0 P(M=m)$ (cumulative) | $P(M \geq m)$ |
|---|---|---|---|
| 0 | 0 | 0 | |
| 1 | 0 | 0 | |
| 2 | 0 | 0 | |
| 3 | 0 | 0 | |
| 4 | 0 | 0 | |
| 5 | 0 | 0 | |
| 6 | 0 | 0 | |
| 7 | 0 | 0 | |
| 8 | .0001 | .0001 | |
| 9 | .0005 | .0006 | |
| 10 | .0017 | .0023 ($m_1$), $P(M \leq m) \leq \alpha_0$ | |
| 11 | .0053 | .0076 | |
| 12 | .0144 | .0220 | |
| 13 | .0334 | .0551 | |
| 14 | | | |
| 15 | | | |
| 16 | DATA NOT SHOWN | | |
| 17 | for m=14 to 20 | | |
| 18 | | | |
| 19 | | | |
| 20 | | | |
| 21 | .0397 | .9833 | .0564 |
| 22 | .0135 | .9968 | .0167 |
| 23 | .0029 | .9997 ($m_2$), $P(M \geq m) \leq \alpha_0/2$ | .0032 |
| m=k=24 | .0003 | 1.0000 | .0003 |

FIG. 5

SYSTEM AND APPARATUS FOR THE DETECTION OF RANDOMNESS IN TIME SERIES DISTRIBUTIONS MADE UP OF SPARSE DATA SETS

STATEMENT OF GOVERNMENT INTEREST

The invention described herein may be manufactured and used by or for the Government of the United States of America for Governmental purposes without the payment of any royalties thereon or therefore.

BACKGROUND OF THE INVENTION

(1) Field of the Invention

The invention generally relates to signal processing/data processing systems for processing time series distributions containing a small number of data points (e.g., less than about ten (10) to fifteen (15) data points). More particularly, the invention relates to a method and apparatus for classifying the white noise degree (randomness) of a selected signal structure comprising a time series distribution composed of a highly sparse data set. As used herein, the term "random" (or "randomness") is defined in terms of a "random process" as measured by the probability distribution model used, namely a nearest-neighbor stochastic (Poisson) process. Thus, pure randomness, pragmatically speaking, is herein considered to be a time series distribution for which no function, mapping or relation can be constituted that provides meaningful insight into the underlying structure of the distribution, but which at the same time is not chaos.

(2) Description of the Prior Art

Recent research has revealed a critical need for highly sparse data set time distribution analysis methods and apparatus separate and apart from those adapted for treating large sample distributions. This is particularly the case in applications such as naval sonar systems which require that input time series signal distributions be classified according to their structure, i.e., periodic, transient, random or chaotic. It is well known that large sample methods often fail when applied to small sample distributions, but that the same is not necessarily true for small sample methods applied to large data sets.

Very small data set distributions may be defined as those with less than about ten (10) to fifteen (15) measurement (data) points. Such data sets can be analyzed mathematically with certain nonparametric discrete probability distributions, as opposed to large-sample methods which normally employ continuous probability distributions (such as the Gaussian).

The probability theory discussed herein and utilized by the present invention is well known. It may be found, for example, in works such as P. J. Hoel et al., *Introduction to the Theory of Probability*, Houghton-Mifflin, Boston, Mass., 1971, which is hereby incorporated herein by reference.

Also, as will appear more fully below, it has been found to be important to treat white noise signals themselves as the time series signal distribution to be analyzed, and to identify the characteristics of that distribution separately. This aids in the detection and appropriate processing of received signals in numerous data acquisition contexts, not the least of which include naval sonar applications. Accordingly, it will be understood that prior analysis methods and apparatus analyze received time series data distributions from the point of view of attempting to find patterns or some other type of correlated data therein. Once such a pattern or correlation is located, the remainder of the distribution is simply discarded as being noise. It is believed that the present invention will be useful in enhancing the sensitivity of present analysis methods, as well as being useful on its own.

SUMMARY OF THE INVENTION

Accordingly, it is an object of the invention to provide a method and apparatus including an automated measurement of the spatial arrangement among a very small number of points, object, measurements or the like whereby an ascertainment of the noise degree (i.e., randomness) of the time series distribution may be made.

It also is an object of the invention to provide a method and apparatus useful in naval sonar systems which require acquired signal distributions to be classified according to their structure (i.e., periodic, transient, random, or chaotic) in the processing and use of those acquired signal distributions as indications of how and from where they were originally generated.

Further, it is an object of the invention to provide a method and apparatus capable of labeling a time series distribution with (1) an indication as to whether or not it is random in structure, and (2) an indication as to whether or not it is random within a probability of false alarm of a specific randomness calculation.

With the above and other objects in view, as will hereinafter more fully appear, a feature of the invention is the provision of a random process detection method and subsystem for use in a naval sonar signal processing/data processing system. In a preferred embodiment, the random process (white noise) detection subsystem includes an input for receiving a time series distribution of data points expressed in Cartesian coordinates. This set of data points will be characterized by no more than a maximum number of points having a value (amplitude) between a maximum and a minimum value received within a preselected time interval. A hypothetical representation of a white noise time series signal distribution in Cartesian space is illustratively shown in FIG. 1. The invention is specifically adapted to analyze both selected portions of such time series distributions, and the entirety of the distribution depending upon the sensitivity of the randomness determination which is required in any particular instance.

The input time series distribution of data points is received by a display/operating system adapted to accommodate a pre-selected number of data points N having a value (amplitude for sonar signals and the like) within certain limits within a pre-selected time interval. The display/operating system then creates a virtual window around the input data distribution, and divides the geometric area of the virtual window into a grid consisting of cells each having the same geometric shape and an equal enclosed area. Ideally, the grid fills the entire area of the window, but if it does not, the unfilled portion of the window is disregarded in the randomness determination.

An analysis device then examines each cell to determine whether or not one or more of the data points of the input time series distribution is located therein. Thereafter, a counter calculates the number of occupied cells. Also, the number of cells which would be expected to be occupied in the grid for a totally random distribution is predicted by a computer device according to known Poisson probability process theory equations. In addition, the statistical bounds of the predicted value are calculated based upon known discrete binomial criteria.

A comparator is then used to determine whether or not the actual number of occupied cells in the input time series distribution is the same as the predicted number of cells for a random distribution. If it is, the input time series distribution is characterized as random. If it is not, the input time series distribution is characterized as nonrandom.

Thereafter, the characterized time series distribution is labeled as random or nonrandom, and/or as random or nonrandom within a pre-selected probability rate of the expected randomness value prior to being output back to the remainder of the data processing system. In the naval sonar signal processing context, this output either alone, or in combination with overlapping similarly characterized time series signal distributions, will be used to determine whether or not a particular group of signals is white noise. If that group of signals is white noise, it commonly will be deleted from further data processing. Hence, it is contemplated that the present invention, which is not distribution dependent in its analysis as most prior art methods of signal analysis are, will be useful as a filter or otherwise in conjunction with current data processing methods and equipment.

In the above regards, it should be understood that the statistical bounds of the predicted number of occupied cells in a random distribution (including cells occupied by mere chance) mentioned above may be determined by a second calculator device using a so-called probability of false alarm rate. In this case, the actual number of occupied cells is compared with the number of cells falling within the statistical boundaries of the predicted number of occupied cells for a random distribution in making the randomness determination. This alternative embodiment of the invention has been found to increase the probability of being correct in making a randomness determination for any particular time series distribution of data points by as much as 60%.

The above and other novel features and advantages of the invention, including various novel details of construction and combination of parts will now be more particularly described with reference to the accompanying drawings and pointed out by the claims. It will be understood that the particular device and method embodying the invention is shown and described herein by way of illustration only, and not as limitations on the invention. The principles and features of the invention may be employed in numerous embodiments without departing from the scope of the invention in its broadest aspects.

BRIEF DESCRIPTION OF THE DRAWINGS

Reference is made to the accompanying drawings in which is shown an illustrative embodiment of the apparatus and method of the invention, from which its novel features and advantages will be apparent to those skilled in the art, and wherein.

DESCRIPTION OF THE PREFERRED EMBODIMENT

Referring now to the drawings, a preferred embodiment of the method and apparatus of the invention will be presented first from a theoretical perspective, and thereafter, in terms of a specific example. In this regard, it is to be understood that all data points are herein assumed to be expressed and operated upon by the various apparatus components in a Cartesian coordinate system. Accordingly, all measurement, signal and other data input existing in terms of other coordinate systems is assumed to have been re-expressed in a Cartesian coordinate system prior to its input into the inventive apparatus or the application of the inventive method thereto.

Figure 1:
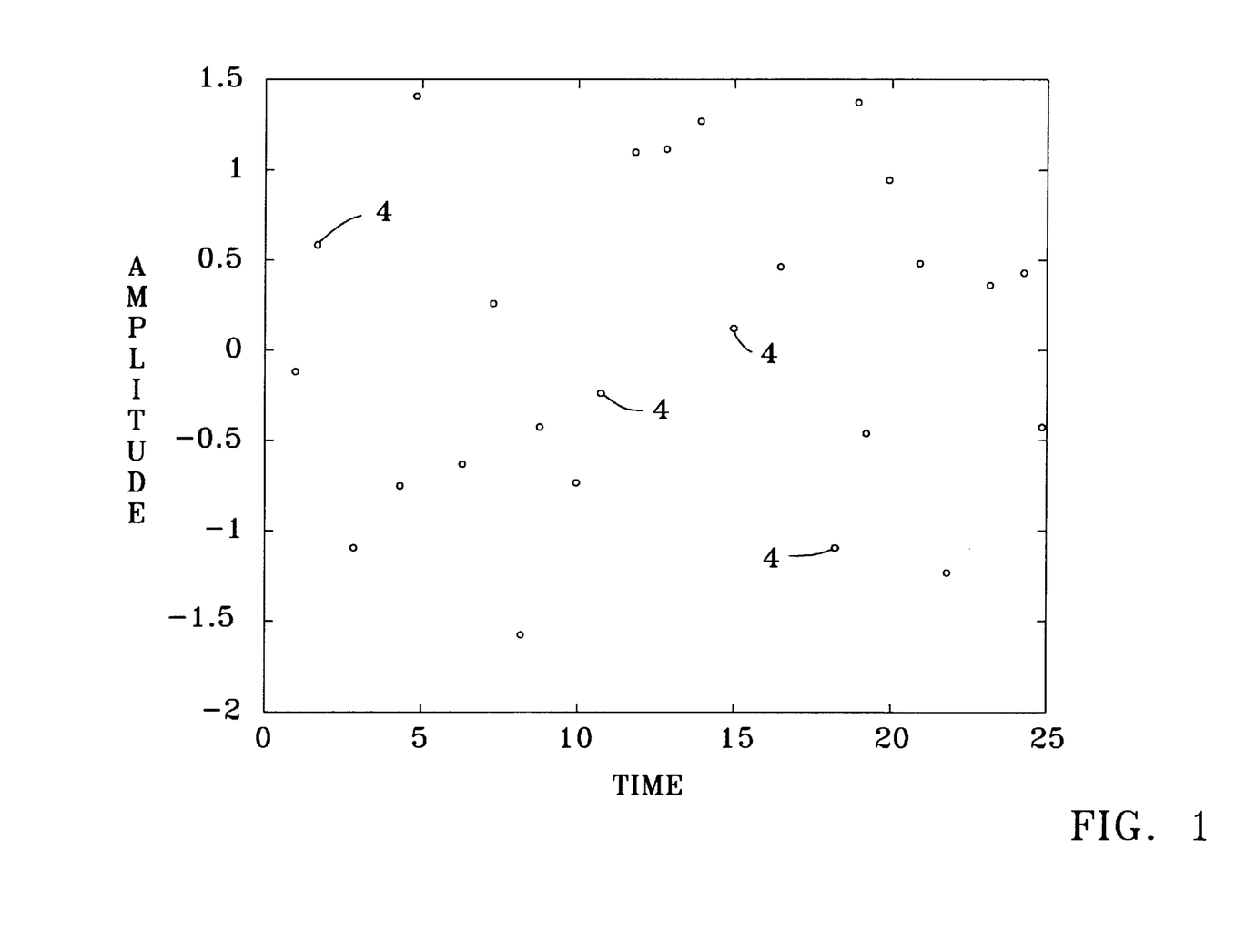
FIG. 1 is a hypothetical depiction in Cartesian coordinates of a representative white noise (random) time series signal distribution.

The invention starts from the preset capability of a display/operating system 8 (FIG. 4) to accommodate a set number of data points N in a given time interval $\cong t$. The value (amplitude) of each data point in each time series distribution falls within limits which may be expressed as $\cong Y = \max(Y) - \min(Y)$. A representation of a time series distribution of random sonar input data points 4 is shown in FIG. 1. A subset of this overall time series data distribution would normally be selected for analysis of its signal component distribution by this invention.

Figure 2:
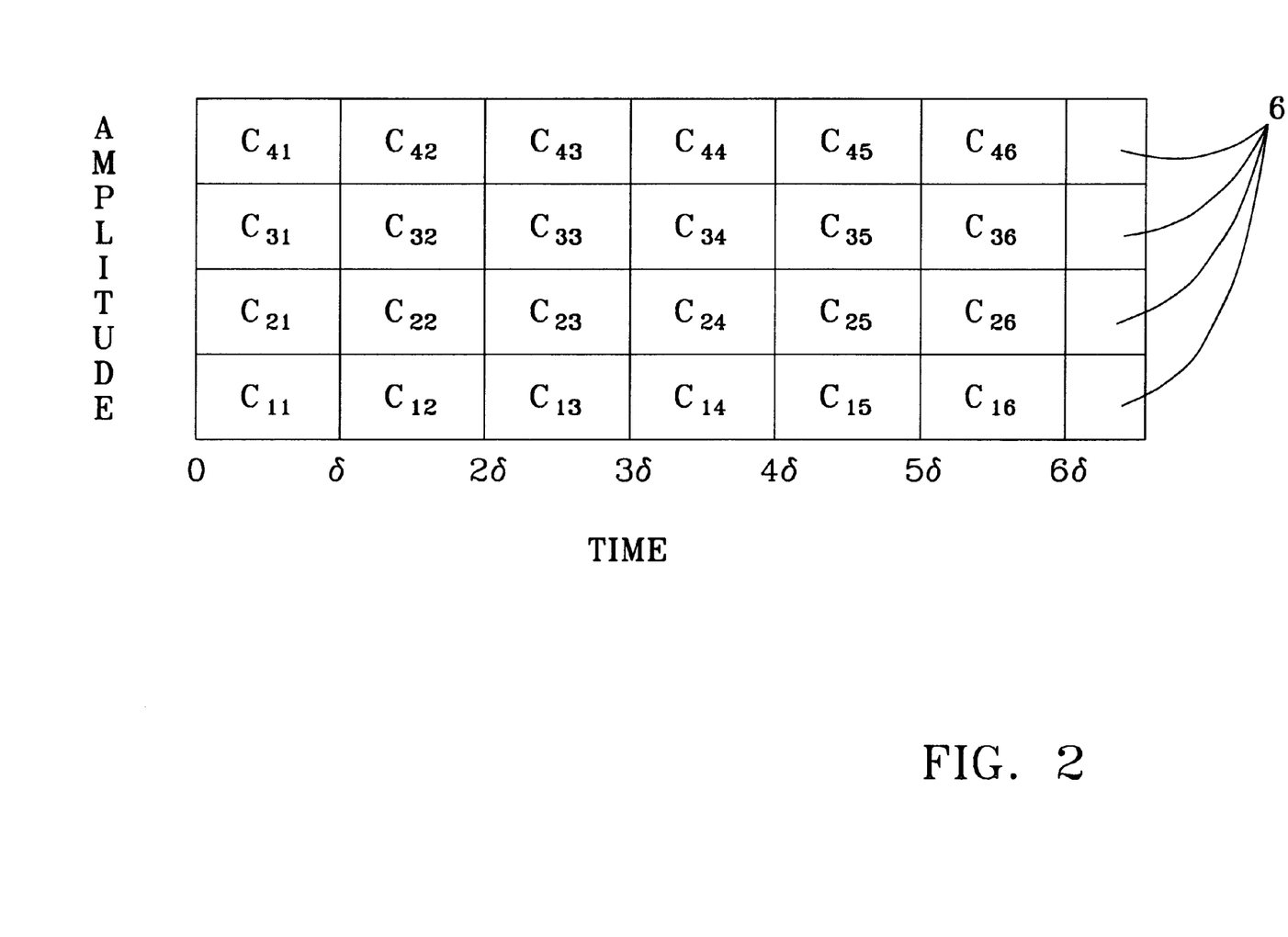
FIG. 2 is a hypothetical illustrative representation of a virtual window in accordance with the invention divided into a grid of square cells each having a side of length $\delta$, and an area of $\delta^2$.

For purposes of mathematical analysis of the signal components, it is assumed that the product/quantity given by $\cong t^* \Delta Y = [\max(t) - \min(t)]^*[\max(Y) - \min(Y)]$ will define the window "geometric area" with respect to the quantities in the analysis subsystem. The sides of the $\cong t^* \Delta Y$ window are drawn parallel to the time axis and amplitude axis, respectively, although other window shapes may be employed (such as a convex polygon) without departure from the invention in its broadest aspects. Then, for substantially the total area of the display region, a Cartesian partition is superimposed on the region with each partition being a small square of side $\delta$ (see, FIG. 2). The measure of $\delta$ will be defined herein as:

$$\delta = (\Delta t^* \Delta Y / k)^{1/2}$$

The quantity k represents the total number of small squares each of area $\delta^2$ created in the area $\cong t^* \Delta Y$. Incomplete squares 6 are ignored in the analysis. The quantity of such squares which it is desired to occupy with at least one data point from an input time series distribution is determined using the following relationship wherein N is the maximum number of data points in the time series distribution, $\cong t$ and $\Delta Y$ are the Cartesian axis lengths, and the side lengths of each of the squares is $\delta$:

$$K_I = \mathrm{int}(\Delta t / \delta_I) * \mathrm{int}(\Delta Y / \delta_I)$$

where int is the integer operator,
$\delta_I = \sqrt{[(\Delta t^* \Delta Y)/k_o]}$, and
$k_o = k_1$ if $|N - k_1| \leq |N - k_2|$ or
$\quad = k_2$ otherwise
where
$\quad k_1 = [\mathrm{int}(N^{1/2})]^2$
$\quad k_2 = [\mathrm{int}(N^{1/2}) + 1]^2$
$\quad k_{II} = \mathrm{int}(\Delta t / \delta_{II}) * \mathrm{int}(\Delta Y / \delta_{II})$
$\quad$ where
$\quad \quad \delta_{II} = \sqrt{[(\Delta t^* \Delta Y)/N]}$
$\quad \quad \therefore k = k_I$ if $K_I > K_{II}$
$\quad \quad k = k_{II}$ if $K_I < K_{II}$
$\quad \quad k = \max(k_I, k_{II})$ if $K_I = K_{II}$ where $K_I = \delta_I^2 k_I / (\Delta t \cdot \Delta Y) \leq 1$ and
$K_{II} = \delta_{II}^2 k_{II} / (\Delta t \cdot \Delta Y) \leq 1$ In cases with very small amplitudes, it may occur that $\text{int}(\Delta Y/\delta_I) \leq 1$ or $\text{int}(\Delta Y/\delta_{II}) \leq 1$. In such cases, the solution is to round off either quantity to the next highest value (i.e., $\geq 2$). This weakens the theoretical approach, but it allows for practical measurements to be made.

Thus, for example, if $\Delta t$ (or N)=30, and $\Delta Y=20$, then k=24 and $\delta=5.0$. Accordingly, $k*\delta^2=24*25=600=\cong t*\Delta Y$. In essence, therefore, the above relation defining the value k selects the number of squares of length $\delta$ and area $\delta^2$ which fill up the total space $\cong t*\Delta Y$ to the greatest extent possible (i.e., ideally $k*\delta^2=\cong t*\Delta Y$).

From the selected partitioning parameter k, the region (area) $\cong t*\Delta Y$ is carved up into k squares with the length of each square being $\delta$ as defined above. In other words, the horizontal (or time) axis is marked off into intervals, exactly $\text{int}(\Delta t/\delta)$ of them, so that the time axis has the following arithmetic sequence of cuts (assuming that the time clock starts at $\Delta t=0$):

$$0, \delta, 2\delta, \ldots, \text{int}(\Delta t/\delta)*\delta$$

Likewise, the vertical (or measurement or amplitude) axis is cut up into intervals, exactly $\text{int}(\Delta Y/\delta)$ of them, so that the vertical axis has the following arithmetic sequence of cuts:

$$\min(Y), \min(Y)+\delta, \ldots, \min(Y)+\text{int}(\Delta Y/\delta)*\delta=\max(Y),$$

where min is the minimum operator and $\delta$ is defined as above.

Based on the Poisson point process theory for a measurement set of data in a time interval $\Delta t$ of measurement magnitude $\Delta Y$, that data set is considered to be purely random (or "white noise") if the number of partitions k are nonempty (i.e., contain at least one data point of the time series distribution thereof under analysis) to a specified degree. The expected number of nonempty partitions in a random distribution is given by the relationship:

$$k*\Theta = k*(1-e^{-N/k})$$

where the quantity $\Theta$ is the expected proportion of nonempty partitions in a random distribution and N/k is "the parameter of the spatial Poisson process" corresponding to the average number of points observed across all subspace partitions.

The boundary, above and below $k*\Theta$, attributable to random variation and controlled by a false alarm rate is the so-called "critical region" of the test. The quantity $\Theta$ not only represents (a) the expected proportion of nonempty partitions in a random distribution, but also (b) the probability that one or more of the k partitions is occupied by pure chance, as is well known to those in the art. The boundaries of the random process are determined in the following way.

Let M be a random variable representing the integer number of occupied cells (partitions) as illustratively shown in FIG. 2. Let m be an integer (sample) representation of M. Let $m_1$ be the quantity forming the lower random boundary of the statistic $k*\Theta$ given by the binomial criterion:

$$P(M \leq m) \leq \alpha_0/2, \min(\alpha/2-\alpha_0/2)$$

where, $P(M \leq m) = \Sigma B(m;k,\Theta)$ from $m=0$ to $m=m_1$, and
k and $\Theta$ are defined as above.

$B(m;k,\Theta)$ is the binomial probability function given as:

$$B(m;k,\Theta) = (k,m)(\Theta)^m(1-\Theta)^{k-m}$$

where (k,m) is the binomial coefficient, $(k,m)=k!/m!(k-m)!$ and $\Sigma B(m;k,\Theta)$ from $m=0$ to $m=k$ equals 1.0.

The quantity $\alpha_0$ is the probability of coming closest to an exact value of the pre-specified false alarm probability $\alpha$, and $m_1$ is the largest value of m such that $P(M \leq m) \leq \alpha_0/2$. It is an objective of this method to minimize the difference between $\alpha$ and $\alpha_0$. The recommended values of $\alpha$ (the probability false alarm rate) for differing values of spatial subsets k are as follows:

If k>25, the $\alpha=0.01$;
If $5 \leq k \leq 25$, then $\alpha=0.05$; and
If k<5, then $\alpha=0.10$ The upper boundary of the random process is called $m_2$, and is determined in a manner similar to the determination of $m_1$.

Thus, let $m_2$ be the upper random boundary of the statistic $k*\Theta$ given by:

$$P(M \geq m) \leq \alpha_0/2, \min(\alpha/2-\alpha_0/2)$$

where $$P(M \geq m) = \sum_{m=m_2}^{k} B(m; k, \Theta) \leq \alpha_o/2$$

or $$P(M \geq m) = 1 - \sum_{m=0}^{m_2} B(m; k, \Theta) \leq \alpha_o/2$$

$\alpha_0$ is the probability of coming closest to an exact value of the pre-specified false alarm probability $\alpha$, and $m_2$ is the largest value of m such that $P(M \geq m) \leq \alpha_0/2$. It is an objective of the invention to minimize the difference between $\alpha$ and $\alpha$.

Hence, the subsystem determines if the signal structure contains m points within the "critical region" warranting a determination of "random".

The subsystem also assesses the random process hypothesis by testing:

$H_0: \overline{P} = \Theta$ (Noise)
$H_1: \overline{P} \neq \Theta$ (Signal+Noise)

Where $\overline{P} = m/k$ is the sample proportion of signal points contained in the k subregion partitions expected to be occupied by a truly random (stochastic) spatial distribution. As noted above, FIG. 1 shows what a hypothetical white noise (random) distribution looks like in Cartesian time-space.

Thus, if $\Theta \approx \overline{P} = m/k$, the observed distribution conforms to a random distribution corresponding to "white noise".

The estimate for the proportion of k cells occupied by N measurements ($\overline{P}$) is developed in the following manner. Let each of the k cells of length $\delta$ be denoted by $C_{ij}$ and the number of objects observed in each $C_{ij}$ cell be denoted $\text{card}(C_{ij})$ where card means "cardinality" or subset count. $C_{ij}$ is labeled from left to right starting at the lower left-hand corner $C_{11}, C_{12}, \ldots, C_{46}$ (see FIG. 2).

Next to continue the example for k=24 shown in FIG. 2, define the following count quantity for the 6×4 partition comprising whole square subsets:

$X_{ij}=1$ if $\text{card}(C_{ij})>0$; i=1 to 4, j=1 to 6
$X_{ij}=0$ if $\text{card}(C_{ij})=0$; i=1 to 4, j=1 to 6 where card is the cardinality or count operator. $X_{ij}$ is a dichotomous variable taking on the individual values of 1 if a cell $C_{ij}$ has one or more objects present, and a value of 0 if the box is empty.

Then calculate the proportion of 24 cells occupied in the partition region:

$$\overline{P} = 1/24 \Sigma\Sigma X_{ij}$$

where the sums are taken from j=1 to 6 and i=1 to 4, respectively.

The generalization of this example to any sized table is obvious, and within the scope of the present invention. For the general case, it will be appreciated that, for the statistics $X_{ij}$ and $C_{ij}$ the index j runs from 1 to $\text{int}(\Delta t/\delta)$ and the index i runs from 1 to $\text{int}(\Delta Y/\delta)$.

In addition, another measure useful in the interpretation of outcomes is the R ratio, defined as the ratio of observed to expected occupancy rates:

$$R = m/(k*\Theta) = \overline{P}/\Theta$$

The range of values for R indicate:

R<1, clustered distribution

R=1, random distribution; and

R>1, uniform distribution.

In actuality, R may never have a precise value of 1. Therefore the data is considered random when $R_{j-1} \geq R_j \geq R_{j+1}$ where $R_j = 1 - R_j$. This formulation thus provides a range for randomness for R statistics within those bounds. The R statistic may be used in conjunction with the formulation just described involving the binomial probability distribution and false alarm rate in deciding to accept or reject the "white noise" hypothesis—or it may be used as the sole determinant. In summary, operators may find the role of the R statistic to be more intuitively useful. Intelligent operators will always employ a plot of time series and its amplitude, in order to eliminate the obvious situations of a "perfect" functional or relational form being analyzed which can be easily seen to be nonrandom, but which computationally may be concluded to be random.

EXAMPLE

Figure 3:
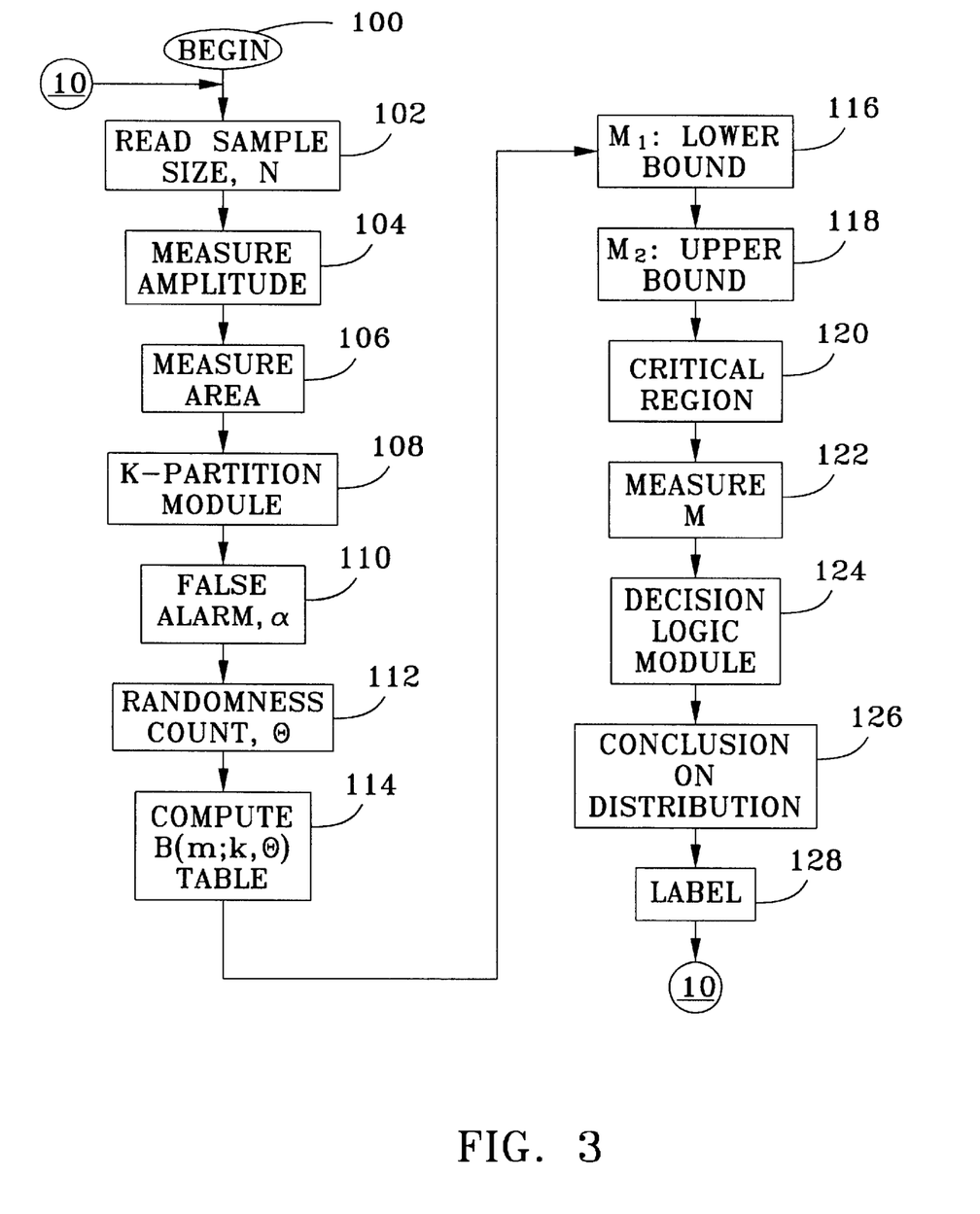
FIG. 3 is a block diagram representatively illustrating the method steps of the invention.
Figure 4:
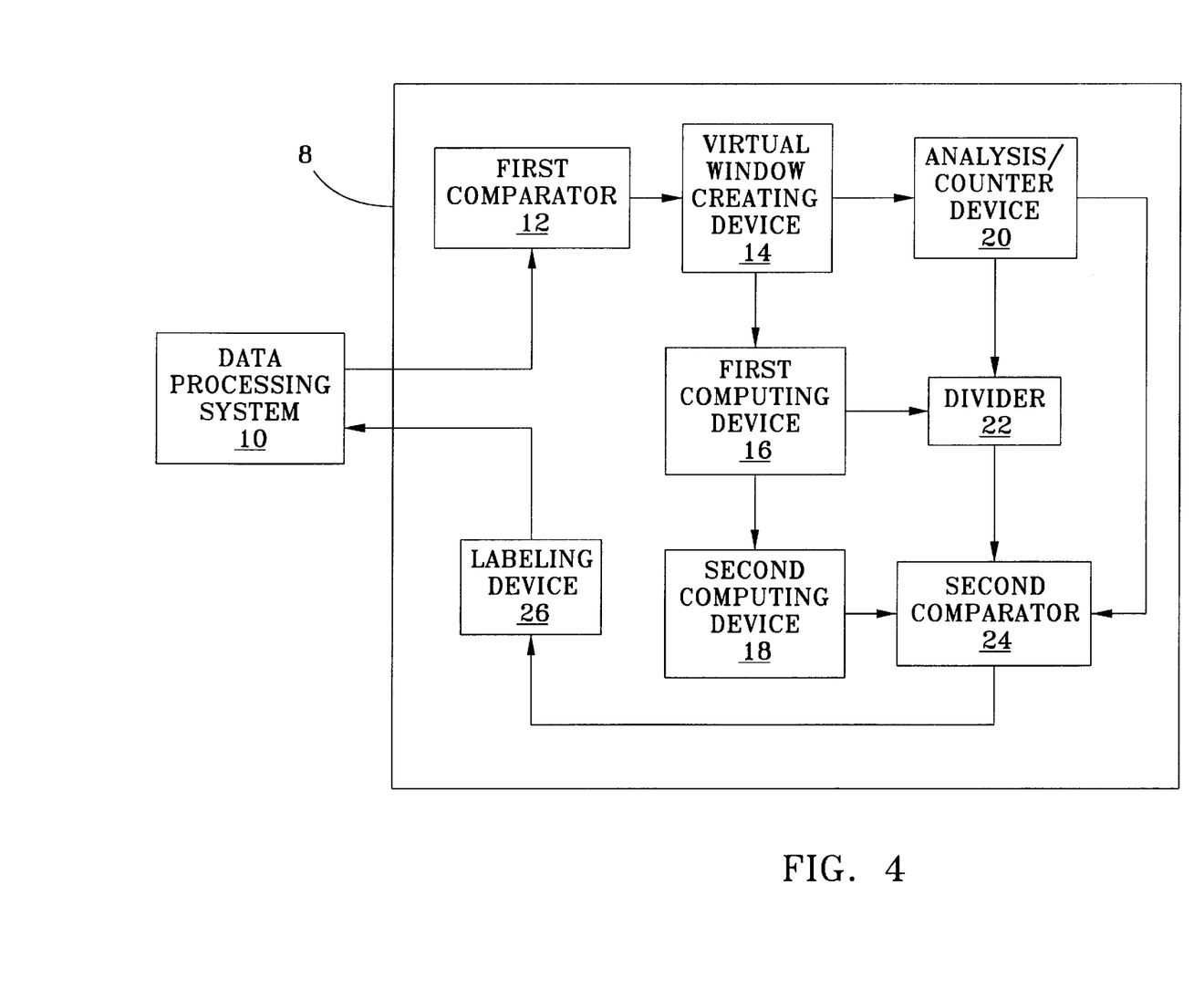
FIG. 4 is a block diagram representatively illustrating an apparatus in accordance with the invention.

Having thus explained the theory of the invention, an example thereof will now be presented for purposes of further illustration and understanding (see, FIGS. 3 and 4). A value for N is first selected, here N=30 (step 100, FIG. 3). A time series distribution of data points is then read into a display/operating subsystem 8 adapted to accommodate a data set of size N from data processing system 10 (step 102). Thereafter, the absolute value of the difference between the largest and the smallest data points $\Delta Y$ is determined by a first comparator device 12 (step 104). In this example, it will be assumed that N=$\Delta t$=30 measurements with a measured amplitude of $\Delta Y$=20 units. The N and $\Delta Y$ values are then used by window creating device 14 to create a virtual window in the display/operating system enclosing the input time series distribution, the size of the window so created being $\Delta t * \Delta y = 600$ (step 106).

Thereafter, as described above, the virtual window is divided by the window creating device 14 into a plurality k of cells $C_{ij}$ (see FIG. 4), each cell having the same geometric shape and enclosing an equal area so as to substantially fill the virtual window containing the input time series distribution set of data points (step 108). The value of k is established by the relation:

$$k = \text{int}(\Delta t/\delta) * \text{int}(\Delta Y/\delta) = 6*4 = 24$$

$$\delta = \sqrt{(\Delta t * \Delta Y)/k} = 5.0$$

Thus, the 600 square unit space of the virtual window is partitioned into 24 cells of side 5.0 so that the whole space is filled ($k*\delta^2 = 600$). The time-axis arithmetic sequence of cuts are: $0, 5, \ldots, \text{int}(\Delta t/\delta)*\delta = 30$. The amplitude axis cuts are: $\min(Y), \min(Y)+\delta, \ldots, \min(Y)+\text{int}(\Delta Y/\delta)*\delta = \max(Y)$ Next, the probability false alarm rate is set at step 110 according to the value of k as discussed above. More particularly, in this case $\alpha$=0.01, and the probability of a false alarm within the critical region is $\alpha/2$=0.005.

The randomness count is then calculated by first computing device 16 at step 112 according to the relation $k*\Theta = k*(1-e^{-N/k})$ which in this example equals 0.713. Therefore, the number of cells expected to be nonempty in this example if the input time series distribution is random is about 17.

Figure 5:
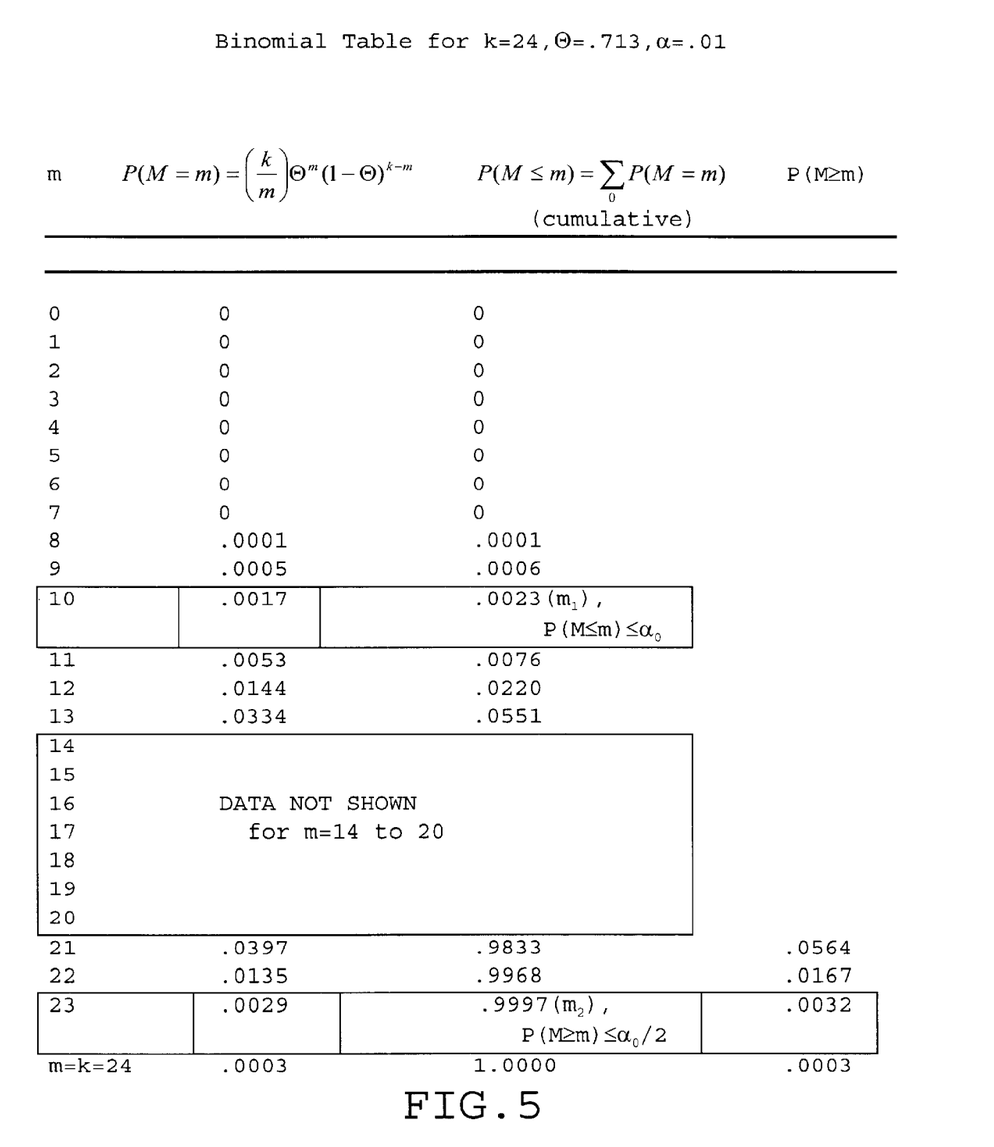
FIG. 5 is a table showing an illustrative set of discrete binomial probabilities for the randomness of each possible number of occupied cells of a particular time series distribution within a specific probability of false alarm rate of the expected randomness number.

The binomial distribution discussed above is then calculated by a second computing device 18 according to the relationships discussed above (step 114, FIG. 3). Representative values for this distribution are shown in FIG. 5 for each number of possible occupied cells m.

The upper and lower randomness boundaries then are determined, also by second calculating device 18. Specifically, the lower boundary is calculated using $m_1$ from FIG. 5 (step 116). Then, computing the binomial probabilities results in $P(M \leq 10) = 0.0025$. Thus, the lower bound is $m_1$ 10. FIG. 5 also shows the probabilities for $\Theta=0.713$, k=24.

The upper boundary, on the other hand, is the randomness boundary $m_2$ from the criterion $P(M \geq m) \leq \alpha_0/2$. Computing the binomial probabilities gives $P(M \geq 23) = 0.0032$; hence $m_2 = 23$ is taken as the upper bound (step 118). The probabilities necessary for this calculation also are shown in FIG. 5.

Therefore, the critical region is defined in this example as $m_1 \leq 10$, and $m_2 \geq 23$ (step 120).

The actual number of cells containing one or more data points of the time series distribution determined by analysis/counter device 20 (step 122, FIG. 3) is then used by divider 22 and a second comparator 24 in the determination of the randomness of the distribution (step 124, FIG. 3). Specifically, using m=16 as an example, it will be seen that $\overline{P} = m/k = 0.667$, and that $R = \overline{P}/\Theta = 0.667/0.713 = 0.93$. This value is close to the randomness boundary without consideration of the discrete binomial probability calculations discussed above. It is also worth noting in this regard that the total probability is 0.0023+0.0032=0.0055, which is the probability of being wrong in deciding "random". This value is less than the probability of a false alarm. Thus, the actual protection against an incorrect decision is much higher (by about 45%) than the a priori sampling plan specified.

Since m=16 falls inside of the critical region, i.e., $m_1 \leq 16 \leq m_2$, the decision is that the data represent an essentially white noise distribution (step 126). Accordingly, the distribution is labeled at step 128 by the labeling device 26 as a noise distribution, and transferred back to the data processing system 10 for further processing. In the naval sonar situation, a signal distribution labeled as white noise would be discarded by the processing system, but in some situations a further analysis of the white noise nature of the distribution would be possible. Similarly, the invention is contemplated to be useful as an improvement on systems which look for patterns and correlations among data points. For example, overlapping time series distributions might be analyzed in order to determine where a meaningful signal begins and ends.

It will be understood that many additional changes in the details, materials, steps and arrangement of parts, which have been herein described and illustrated in order to explain the nature of the invention, may be made by those skilled in the art within the principles and scope of the invention as expressed in the appended claims.

What is claimed is:

1. A method for characterizing a spatial arrangement among a pre-selected number N of data points of a time series distribution of pre-selected duration in a display/operating system wherein a classification of the spatial arrangement of said time series distribution is required, said method comprising the steps of:

inputting said time series distribution of no more than N data points and no longer than said pre-selected time interval into said display/operating system;

determining the difference in value ΔY between the data point in said time series distribution having the greatest value and the data point in said time series distribution having the smallest value;

creating a virtual window having an area containing said time series distribution of data points, said area being equal to N*ΔY;

subdividing substantially the entirety of said area of said window into a plurality k of cells, each said cell having the same polygonal shape and defining the same area value;

determining a number m of said cells containing at least one of said data points of said time series distribution;

determining an expected number M of cells containing at least one of said data points in said time series distribution in the event that said time series distribution is random in structure; and characterizing said input time series distribution as clustered in the event that m is less than M, random when m is equal to M, and uniform when m is greater than M.

2. A method according to claim 1 wherein said time series distribution comprises less than about fifteen (15) data points.

3. A method according to claim 1 wherein said display/operating system comprises a component of a naval sonar system.

4. A method according to claim 1 wherein the characterizing step further comprises the steps of:

determining the statistical bounds of M based upon a probability of false alarm rate which is equal to 0.01 when k is greater than 25, 0.05 when k is greater than or equal to 5 and less than or equal to 25, and 0.10 when k is less than 5; and further characterizing said input time series distribution as random if m is within the statistical bounds of M.

5. A method according to claim 4 wherein a discrete binomial probability distribution is used in determining said statistical bounds.

6. A method for characterizing a spatial arrangement among data points of a subset of a time series distribution in a data processing system wherein a randomness classification of the time series distribution is required, said method comprising the steps of:

inputting the time series distribution subset of data points, expressed in the form of Cartesian coordinates, into a display/operating system designed to accommodate the subset, the subset having a pre-selected number of data points N within a pre-selected time interval;

measuring the difference between a maximum value of the data points of said distribution and a minimum value of the data points of said distribution;

creating a virtual window of a preselected geometric shape enclosing a geometric area adapted to contain as many as said preselected number of data points N having a value between said maximum value and said minimum value of the data points of said input time series distribution;

partitioning said virtual window so as to create therein a grid comprising a plurality k of cells, each of said cells having the same geometric shape and defining an equal area, said grid substantially filling said virtual window;

selecting a probability of false alarm rate α equal to 0.01 when the total number of cells is greater than 25, 0.05 when the total number of cells is greater than or equal to 5 and less than or equal to 25, and 0.10 when the total number of cells is less than 5;

calculating the number of cells in said grid expected to contain at least one of said input data points in a random distribution according to the relationship $$k*\Theta = k*(1-e^{-N/k})$$

wherein N/k is the average number of data points located across the entire grid, and Θ is the expected proportion of cells containing at least one data point in a random distribution;

calculating the binomial distribution $$B(m;k,\Theta) = (k,m)(\Theta)^m(1-\Theta)^{k-m}$$

where m is the number of cells containing at least one of said data points and (k,m) is the binomial coefficient, (k,m)=k!/(m!(k-m)!);

calculating the lower randomness boundary $m_1$ of $k*\Theta$ using the values from the binomial distribution calculating step and the criterion:

$$P(M \leq m) \leq \alpha_0/2, \min(\alpha/2 - \alpha_0/2)$$

where, $P(M \leq m) = \Sigma B(m;k,\Theta)$ from m=0 to m=$m_1$, and $\Sigma B(m;k,\Theta)$ from m=0 to m=k equals 1.0, M is the expected number of cells containing at least one data point, and $\alpha_0$ is the probability coming closest to an exact value of the pre-selected probability of false alarm rate α;

calculating the upper randomness boundary $m_2$ of $k*\Theta$ in a manner similar to calculating m, using the criterion:

$$P(M \geq m) \leq \alpha_0/2, \min(\alpha/2 - \alpha_0/2)$$

where $P(M \geq m) = \Sigma B(m;k,\Theta)$ from m=$m_2$ to m=k;

comparing the number of cells in said grid containing at least one of said input data points with the range defined around $k*\Theta$ by $m_1$ and $m_2$;

calculating the ratio of observed to expected cell occupancy rates according to the relation: $R = m/(k*\Theta)$;

determining said subset to be random when at least one condition of the number of cells containing at least one of said input data points falls between $m_1$ and $m_2$, and R having its value closest to 1, is satisfied;

closing said virtual window and selecting the next subset of the time data series for characterization when said subset is random; and transferring said subset to said data processing system for further analysis as non-white-noise prior to closing said virtual window and selecting the next subset when said subset is nonrandom.

7. The method according to claim 6 wherein k is determined from the relation k=$k_I$ when $K_I$>$K_{II}$ k=$k_{II}$ when $K_I$<$K_{II}$ and k=max($k_I$, $k_{II}$) when $K_I$=$K_{II}$ where $k_I$=int($\Delta t/\delta_I$)*int($\Delta Y/\delta_I$), $K_{II}$=int($\Delta t/\delta_{II}$)*int($\Delta Y/\delta_{II}$), $\delta_I$=√[($\Delta t$*$\Delta Y$)/$k_0$], $k_0$=$k_1$ when |N-$k_1$|≦|N-$k_2$|, $k_0$=$k_2$ otherwise, with $k_1$=[int($N^{1/2}$)]$^2$, $k_2$=[int($N^{1/2}$)+1]$^2$ $\delta_{II}$=√[($\Delta t$*$\Delta Y$)/N]

$K_I$=$\delta_1^2 k_I$/($\Delta t \cdot \Delta Y$)≦1, $K_{II}$=$\delta_{II}^2 k_{II}$/($\Delta t \cdot \Delta Y$)≦1, and int is the integer operator.

8. A method according to claim 7 wherein the respective values of int($\Delta Y/\delta_1$) and int($\Delta Y/\delta_{II}$) are rounded off so as to be at least equal to 2 when a calculated value thereof is a maximum of 1.

9. An apparatus for characterizing a spatial arrangement among data points of a time series distribution in a data processing system wherein a classification of said time series distribution is required, said apparatus comprising:

a display/operating system adapted to accommodate a pre-selected number N of data points generated during a pre-selected time interval;

a first comparator for determining the data points in said input time series distribution having the largest and the smallest values, and determining the difference $\Delta Y$ between said largest and smallest values of said data points;

a virtual window creating device for creating a virtual window having an area equal to N*$\Delta Y$ containing said input time series distribution of data points, and subdividing substantially the entirety of said virtual window into a plurality k of cells, each said cell having the same polygonal geometric shape and defining an equal area;

a counter for determining the number m of said cells containing at least one of said input data points of said input time series distribution;

a calculator device for determining the expected number of said cells which would be occupied by at least one of said data points in the event that said input time series distribution was random according to the relation k*(1-$e^{-N/k}$);

a divider device for dividing m by k*(1-$e^{-N/k}$);

a second comparator device for comparing the output of said divider with the number 1, and for characterizing said input time series distribution as random when the output of said divider is closet to 1, clustered when the output of said divider is less than the output closest to 1, and uniform when the output of said divider is greater than the output closest to 1;

a marking device for associating the output of said second comparator with said input time series distribution; and an output device for transferring said marked input time series distribution to said data processing system for further processing.

10. An apparatus according to claim 9 wherein said data processing system comprises a naval sonar system.

11. An apparatus according to claim 9 further comprising a second calculator for determining the statistical bounds of the expected number of cells which would contain at least one of the data points of said input time series distribution thereof in the event that said distribution was random, said calculator being programmed to calculate said statistical bounds based upon a probability of false alarm rate which is equal to 0.01 when k is greater than 25, 0.05 when k is less than or equal to 25 and greater than or equal to 5, and 0.10 when k is less than 5, said second comparator being also adapted to compare m with the statistical bounds calculated by said second calculator, said labeling device being also adapted to label the output of said second comparator as being within said statistical bounds and not within said statistical bounds.

* * * * *